United States Patent
Görl et al.

(10) Patent No.: US 6,548,584 B1
(45) Date of Patent: Apr. 15, 2003

(54) PULVERULENT RUBBER POWDER CONTAINING FILLER, PROCESS OF THE PRODUCTION THEREOF AND USE THEREOF

(75) Inventors: Udo Görl, Bornheim (DE); Reinhard Stober, Hasselroth (DE); Hartmut Lauer, Bad Soden-Samünster (DE); Uwe Ernst, Marl (DE)

(73) Assignee: PKU Pulverkautschuk Union GmbH, Marl (DE)

( * ) Notice: Subject to any disclaimer, the term of this patent is extended or adjusted under 35 U.S.C. 154(b) by 0 days.

(21) Appl. No.: 09/287,628

(22) Filed: Apr. 7, 1999

(30) Foreign Application Priority Data

Apr. 7, 1998 (DE) .......................... 198 15 453

(51) Int. Cl.$^7$ ................................ C08K 3/10
(52) U.S. Cl. ................ 524/413; 524/423; 524/428; 524/429; 524/436; 524/492; 524/496; 524/571; 524/575
(58) Field of Search ................ 524/571, 575, 524/492, 496, 423, 413, 428, 429, 436

(56) References Cited

U.S. PATENT DOCUMENTS

| | | | | |
|---|---|---|---|---|
| 4,138,375 A | * | 2/1979 | Berg et al. ................. | 260/17 R |
| 4,250,082 A | * | 2/1981 | Sommer et al. ......... | 260/42.55 |
| 4,690,970 A | * | 9/1987 | Feinauer et al. ............ | 524/504 |
| 4,912,151 A | * | 3/1990 | Tappe ......................... | 524/571 |

* cited by examiner

*Primary Examiner*—Peter D. Mulcahy
(74) *Attorney, Agent, or Firm*—Pillsbury Winthrop LLP

(57) ABSTRACT

Pulverulent rubber powder containing filler which remains free-flowing even after exposure to mechanical stresses, a process for the production thereof, in which the rubber powder is obtained in two precipitation steps, and the use of these powders for the production of vulcanizable rubber compounds.

11 Claims, No Drawings

PULVERULENT RUBBER POWDER CONTAINING FILLER, PROCESS OF THE PRODUCTION THEREOF AND USE THEREOF

CROSS REFERENCE TO RELATED APPLICATION

This application is based on German Application No. 19815453.4, the entire disclosure of which is incorporated herein by reference.

FIELD OF THE INVENTION

This invention relates to pulverulent rubbers containing fillers, to a process for the production thereof and to the use thereof.

BACKGROUND OF THE INVENTION

Numerous publications have appeared relating to the aim and purpose of using powdered rubbers as well as to possible processes for the production thereof.

The explanation for the interest in pulverulent rubbers is readily evident from the processing techniques used in the rubber industry, where rubber compounds are produced in time-consuming processes with elevated inputs of energy and labour. The principal reason for this is that the rubber raw material is in bale form.

Comminuting the bale, intimate mixing with fillers, mineral oil plasticizers and vulcanization auxiliaries proceeds in roll mills or in internal mixers in two or more processing stages. The compound is generally stored between the stages. Downstream from the internal mixers or roll mills are extruder/pelletizers or extruder/roller dies. The only way out of this highly complex rubber processing method is to use an entirely novel processing technology. The use of free-flowing rubber powders has accordingly long been discussed as such powders would make it possible to process rubber compounds simply and rapidly in the same manner as pulverulent thermoplastics.

DE-PS 2822 148 discloses a process for the production of a pulverulent rubber containing fillers.

According to this patent, an aqueous filler emulsion is added to a rubber latex, rubber solution or an aqueous emulsion of a rubber and the desired rubber powder is precipitated.

Variants for preventing the resultant filler contents being determined by grain size, as occurs when this process is used, have been filed and, as DE-PS 3723 213 and DE-PS 3723 214, are part of the prior art. According to DE-PS 3723213, in a two-stage process, a quantity of ≧50% of the filler is initially incorporated into the rubber powder particles. In the second stage, the remainder of the filler is applied onto the so-called basic rubber grains. This may be considered a variant of dusting as no bond is created between the filler and rubber.

However, as E. T. Italiaander has pointed out (presentation 151, technical conference of the *Rubber Division* of the *ACS*, Anaheim, Calif., May 6–9, 1997 (GAK 6/1997 (50) 456–464), despite the bright future predicted in the Delphi Report (Delphi Report, "Künftige Herstellverfahren in der Gummiindustrie", *Rubber Journal*, volume 154, no. 11, 20–34 (1972)) for pulverulent and pelletized rubbers and numerous attempts made by well-known polymer manufacturers from the mid 1970's until the early 1980's to produce pulverulent NBR, SBR/carbon black masterbatches and pelletized NR, the rubber bale remains the standard form in which polymers are supplied.

One disadvantage of known processes is firstly that a grinding operation is necessary in order to achieve a grain diameter of the filler particles of 10 $\mu$m, which is considered essential to the quality of the final product.

However, this requires not only elevated energy input but also results in damage to the filler structure which, together with the active surface area, is a significant parameter for its effectiveness in rubber applications.

Secondly, the handling properties of prior art products suffer in that the particles stick together during storage.

SUMMARY OF THE INVENTION

The object of the invention is accordingly to provide a pulverulent rubber containing filler which is easily handled, together with a process for the production thereof.

The present invention provides a pulverulent rubber or rubber powder having a filler content solidly bonded to the rubber matrix by the precipitation process. No confusion is thus possible with only superficially surface coated or adhesively coated rubber particles.

The powders according to the invention exhibit a narrow size distribution which is shifted towards smaller particle sizes as is known from the prior art (Kautschuk+Gummi+Kunststoffe 7, 28 (1975) 397–402). This fact facilitates processing of the powders. Moreover, due to the production process, the filler content of the individual particles is not determined by grain size.

The pulverulent rubbers contain from 20 to 250 phr, in particular from 50 to 100 phr, of filler (phr: parts per hundred parts of rubber).

The following, individually or as mixtures, have proved to be suitable types of rubber:

natural rubber, emulsion SBR having a styrene fraction of 10 to 50%, butyl/acrylonitrile rubber, butyl rubbers, terpolymers prepared from ethylene, propylene (EPM) and unconjugated dienes (EPDM), butadiene rubbers, SBR, produced using a solution polymerization process, having styrene contents of 10 to 25%, as well as 1,2-vinyl constituent contents of 20 to 55% and isoprene rubbers, in particular 3,4-polyisoprene.

In addition to these rubbers, the following elastomers may be considered, individually or as mixtures:

carboxyl rubbers, epoxy rubbers, trans-polypentenamer, halogenated butyl rubbers, rubbers prepared from 2-chlorobutadiene, ethylene/vinyl acetate copolymers, epichlorohydrins, optionally also chemically modified natural rubber, such as for example epoxidized grades. Fillers which may be mentioned are the carbon blacks known from rubber processing and white fillers of a synthetic nature, such as for example precipitated silicas or natural fillers, such as for example siliceous chalk, clays etc.

Carbon blacks, as are generally used in rubber processing, are particularly suitable.

Such carbon blacks include furnace blacks, gas blacks and lamp backs having an iodine absorption value of 5 to 1000 $m^2/g$, a CTAB value of 15 to 600 $m^2/g$, a DBP adsorption of 30 to 400 ml/100 g and a 24 M4 DBP value of 50 to 370 ml/100 g in a quantity of 5 to 250 parts, in particular of 20 to 150 parts, per 100 parts of rubber, in particular of 40 to 100 parts.

Precipitated silicas known from the rubber sector are also suitable.

These generally have an $N_2$ surface area, determined using the known BET method, of 35 to 700 $m^2/g$, a CTAB surface area of 30 to 500 $m^2/g$, a DBP value of 150 to 400 ml/100 g. The product according to the invention contains these silicas in a quantity of 5 to 250 parts, in particular of 20 to 100 parts, relative to 100 parts of rubber.

If white natural fillers are used, such as clays or siliceous chalks having an $N_2$ surface area of 2 to 35 $m^2/g$, they are used in a quantity of 5 to 350 parts, relative to 100 parts of rubber.

Filled rubber powders, which contain a mixture of silicas and carbon black are also suitable. In this case, the total quantity of filler amounts to 20 to 250 parts of filler per 100 parts of rubber.

Apart from the above-stated fillers, the rubber powders according to the invention optionally contain known processing or vulcanization auxiliaries such as zinc oxide, zinc stearate, stearic acid, polyalcohols, polyamines, plasticizers, anti-aging agents to counter the action of heat, light or oxygen and ozone, reinforcing resins, flame retardants, such as for example $Al(OH)_3$ and $Mg(OH)_2$, pigments, various crosslinking chemicals and optionally sulfur in concentrations conventional in rubber processing.

The cross-section of the rubber powders according to the invention differs distinctly from that of products known from the prior art. While these latter products ideally exhibit a homogeneous distribution of the filler in the rubber composition or vice versa and have a shell of filler particles, according to the invention there is a homogeneous distribution of filler and rubber component within the pulverulent products and in the associated peripheral zone.

Depending upon the filler loading of the particles, filler particles are incorporated into the surface, such that the particles do not stick together, even under pressure, such as when several sacks are stacked.

This "inertization" of the surface should not be confused with the known technique of dusting tacky powders with fillers. These only superficially adhering fillers are rapidly detached when exposed to mechanical stress, for example in a conveying plant or on transfer into silos. The sticking and agglomeration of the finely divided powders, which it is the intention of this invention to avoid, then occurs despite the dusting.

Unlike the tacky particles superficially coated with fillers as flow auxiliaries as are known from the prior art, according to the invention, filler particles are incorporated into the surface during the precipitation process for the production of the pulverulent rubber. Depending upon the filler loading with one or more of the above-stated fillers, the advisable distribution between the interior of the particles and an outer zone associated therewith is established.

In a product having an elevated filler loading ($\geq 80$ parts of filler per hundred parts of rubber), only 1 to 10 parts of this quantity of filler are incorporated in the outer grain zone. However, if the pulverulent rubber contains a total of <80 parts of filler per hundred parts of rubber, 10 to 20 parts thereof are incorporated in the outer grain zone (peripheral zone), i.e. do not merely adhere by less effective adhesive forces.

The distributions of the filler within the particles and in the so-called peripheral zone generally vary between these contents.

The greater is the total filler content, the less is the need to suppress the tackiness of the powder by an increased concentration of filler in the peripheral zone.

The present invention also provides a process for the production of finely divided, pulverulent rubbers containing filler (rubber powders) by precipitation from mixtures containing water which contain filler in the form of suspensions, water-soluble salts of a metal of groups IIa, IIb, IIIa and VIII of the periodic system of elements and a rubber latex or aqueous emulsions of a rubber solution by addition of an acid, which process is characterised in that $\geq 50$ wt. % of the finely divided filler is mixed with 0.1 to 6.5 parts by weight per 100 parts by weight of rubber of the stated water-soluble salts and a rubber latex or an aqueous emulsion of a rubber solution, the pH value of the mixture is reduced to a value in the range from 5.5 to 4.5 (first stage), the remainder of the finely divided filler in the form of a suspension is added and the pH value is reduced to approx. 3.2 (second stage), such that the rubber in the mixture is completely precipitated together with the filler.

The duration of the precipitation operation, which is determined by the pH value and the filler content, and the extent thereof may readily be determined by means of a series of measurements.

In the case of a powder rubber having an elevated filler loading ($\geq 80$ parts of filler phr), 1 to 10 parts of this quantity will generally be used as the remaining proportion in the second stage of precipitation of the powder rubber.

If the powder rubber contains less than 80 parts of filler phr, for example a total of only 50 parts phr, >10 to 20 parts of this quantity will be introduced into the mixture in the form of a suspension before conclusion of the precipitation operation.

In this manner, the fillers are incorporated into the outer grain zone (peripheral zone) of the rubber powder.

These proportions of the filler are thus not applied externally onto the individual rubber particles (c.f. DE-PS 37 23213), but are integrated into the surface of the rubber.

This distribution of the filler and the manner in which the fillers are bonded to the rubber composition bring about the elevated flowability of the powders according to the invention and prevent sticking during storage of the powder, without these properties being lost on exposure to mechanical stresses during conveying, transfer into silos etc.

The above-stated carbon blacks are used as fillers in finely divided (fluffy) form, the carbon blacks generally having an average grain diameter of 1 to 9 $\mu$m, preferably 1 to 8 $\mu$m, before they are suspended.

This facilitates dispersion, such that aqueous suspensions containing filler particles of an average particle diameter of distinctly less than 10 $\mu$m are obtained without elevated energy input.

Precipitated silica may advantageously be used in the form of a filter cake which has been washed until salt-free.

Metal salts which may be considered are those originating from elements of groups IIa, IIb, IIIa and VIII of the periodic system of elements. This division into groups corresponds to the former IUPAC recommendation (*Periodisches System der Elemente*, Verlag Chemie, Weinheim, 1985) Typical representatives are magnesium chloride, zinc sulfate, aluminium chloride, aluminium sulfate, iron chloride, iron sulfate, cobalt nitrate and nickel sulfate, wherein the salts of aluminium are preferred. Aluminium sulfate is particularly preferred.

The salts are used in a quantity of 0.1 to 6.5 parts by weight per 100 parts by weight of rubber. Acids suitable and optionally used to establish the defined pH values are primarily mineral acids, such as for example sulfuric acid, phosphoric acid and hydrochloric acid, wherein sulfuric acid is particularly preferred. However, carboxylic acids, such as for example formic and acetic acid, may also be used.

The quantity of acid is determined by the nature and quantity of the water-soluble metal salt, the filler, the rubber and the optionally present alkali metal silicate. This quantity may readily be determined by initial investigatory testing.

According to a preferred embodiment of the process according to the invention, up to 5 parts by weight per 100 parts by weight of rubber of silica ($SiO_2$) are additionally used in the form of an alkali metal silicate solution, preferably as water glass having an $Na_2O:SiO_2$ molar ratio of 2:1 to 1:4. The alkali metal silicate solution may here be added both to the rubber component and to the filler suspension. It is preferably added to the rubber component, especially when the process is performed continuously.

The process according to the invention is generally performed as follows:

first, a filler suspension is produced by dispersing a proportion, preferably ≧50%, of the filler present in the final product in water together with the metal salt and optionally the alkali metal silicate solution. The overall quantity of water is determined by the nature of the filler and the degree of digestion. In general, the water-insoluble constituents of the filler amount to approx. 6 wt. %. This value is not a binding restriction and both lower and higher quantities may be encountered. The maximum content is limited by the pumpability of the suspension.

The filler suspension produced in this manner is then intimately mixed, preferably in the presence of an emulsifier, with the rubber latex optionally containing alkali metal silicate solution or the aqueous emulsion of a rubber solution optionally containing alkali metal silicate solution. Known stirrers, such as for example propeller stirrers, are suitable for this purpose.

After mixing, a pH value in the range from 5.5 to 4.5 is first established while stirring is continued. This results in basic rubber grains having a constant filler content. The size of these basic grains is controlled by the selected quantity of metal salt in the range from 0.1 to 6.5 phr. Control is effected by the largest grain size being obtained with the lowest quantity of metal salt.

The solids content of the latex used generally amounts to 20 to 25 wt. %. The solids content of the rubber solutions is generally 3 to 35 wt. %, that of the rubber emulsions generally from 5 to 30 wt. %.

These mixtures and the production thereof are known from the prior art.

When working up rubber powders having filler contents of ≧100 phr, it is advantageous to reduce the pH value down to 2.5 before phase separation. An acid from the above-stated group of acids is advantageously used for this purpose.

The process according to the invention may be performed both discontinuously and continuously.

The precipitated rubber powder is advantageously separated by means of a centrifuge and then dried to a residual water content of generally ≦1%, preferably in a fluidized bed drier.

During the production process, further processing and/or vulcanization auxiliaries may be added to the rubber powder according to the invention in a quantity conventional for vulcanizable rubber compounds or also a smaller quantity.

The rubber powders according to the invention are used for the production of vulcanizable rubber compounds. The constituents necessary for producing the compound may all be present in the rubber powder. Preferably, however, the powders contain rubber of the above-stated types and fillers. The rubber powders and fillers may, however, also be mixed in a conventional manner with other rubbers and fillers, if this is necessary for the desired rubber compound.

It is possible according to the invention to produce a finely divided rubber powder which is free-flowing and also remains free-flowing after exposure to mechanical stresses (for example conveying, packaging). By virtue of the finely divided nature thereof, no grinding or other comminution measures are required to obtain finely divided dispersions.

These then give rise to the finely divided rubber powders, which may readily be processed, and to vulcanizates having improved properties.

DETAILED DESCRIPTION OF THE PREFERRED EMBODIMENTS

Examples

The Examples describe the processing behaviour of rubber powders produced according to the prior art (DE-PS 3723213) and the rubber powders according to the invention. The technical rubber data obtained with these powders are also compared.

In Example 1, compounds 1 to 4 are produced using an N 375 carbon black in the only form in which it is generally available, namely in wet-beaded form. In order to achieve the fineness required according to DE-PS 3723213 of 10 μm (average grain diameter), the carbon black had to be ground beforehand. This corresponds to the state of the art at the time of filing of the DE-PS3723213 patent. Compounds 5 to 8 of the invention are produced using N 375 in "fluffy" form.

It has been found that the vulcanizate produced using the rubber powders according to the invention gives rise to superior technical rubber data with shorter compounding times for the rubber compounds and identical compositions of the compounds.

Test standards used in the Examples:

|  | Unit | Standard |
|---|---|---|
| Tensile strength | Mpa | DIN 53504 |
| Modulus, 300% | Mpa | DIN 53504 |
| Tear propagation resistance | N/mm | DIN 53507 |
| Shore A hardness | — | DIN 53507 |
| DIN abrasion | $nm^3$ | DIN 53516 |
| Elongation at break | % | DIN 53504 |

| Chemicals used in the Examples: | |
|---|---|
| TESPT | bis (triethoxysilylpropyl)tetrasulfane (Si69, from Degussa AG |
| | Naftolen ZD plasticizer, aromatic hydrocarbons |
| 6PPD | N-1,3-dimethylbutyl-N'-phenyl-p-phenylenediamine |
| CBS | N-cyclohexyl-2-benzothiazolesulfenamide |

Example 1

Comparison of an Emulsion SBR Compound Filled with N 375 (82 Parts) as a Function of Compounding Time (Standard Process in Comparison with Process According to the Invention)

a) Formulations

|  | 1-4 (Comparative) | 5-8 (Invention) |
|---|---|---|
| PB I (standard) | 180 | — |
| EPB I (according to the invention) | — | 180 |
| ZnO RS | 3 | 3 |
| Stearic acid | 2 | 2 |
| Naftolen ZD | 30 | 30 |
| 6PPD | 2 | 2 |
| Wax | 1 | 1 |
| CBS | 1.35 | 1.35 |
| Sulfur | 1.35 | 1.35 | b) Compounding process

1st stage
Internal mixer: GK 1.5 N, volume 1.6 L, friction 1:1.11, plunger pressure 5.5 bar

| Compound | Formulations 1–8 |
|---|---|
| PRM (sic) [1/min] | 60 |
| Temp. [° C.] | 50 |
| Filler loading | 0.85 |
| Compounding time: | |
| 0–0.5' | PB I or EPB I Naftolen ZD, ZnO RS, stearic acid, 6PPD, wax |
| 0.5' | cleaning and venting |
| 0.5'–x' | compounding and discharge |
| x' = 1, 2, 3, 4 | |

Batch temperature: ~150° C.

2nd stage
Internal mixer: GK 1.5 N, volume 1.6 L, friction 1:1.11, plunger pressure 5.5 bar
RPM 40, temperature 50° C., filler loading 0.68

| Compounding time: | |
|---|---|
| 0–0.5' | batch, stage 1 accelerator, sulfur |
| 0.5'–1.5' | compounding, discharge & sheeting out |

Batch temperature: ~110° C.

c) Vulcanizate testing

1. Filler dispersion, particle size, polydispersity

| Compounding time | Standard | | | | Process according to the invention | | | |
|---|---|---|---|---|---|---|---|---|
| [min] | 4 | 3 | 2 | 1 | 4 | 3 | 2 | 1 |
| Dispersion coefficient [%] | 96.5 | 95.7 | 95.4 | 93.5 | 95.4 | 95.6 | 95.2 | 93.4 |
| 1st moment (um) | 13.0 | 17.6 | 16.3 | 16.5 | 11.4 | 10.8 | 12.3 | 12.1 |
| 2nd moment (um) | 21.7 | 28.9 | 28.9 | 27.7 | 15.8 | 13.5 | 17.9 | 16.8 |
| 3rd moment (um) | 36.4 | 40.5 | 40.7 | 41.5 | 27.6 | 19.6 | 30.2 | 26.4 |
| Polydispersity | 0.67 | 0.64 | 0.65 | 0.68 | 0.38 | 0.25 | 0.46 | 0.39 |

The comparison shows that, using the process according to the invention, particle sizes (moments 1–3) are distinctly smaller than in the case of the standard process and that furthermore the particles are also more uniform (lower value for polydispersity).

2. Technical rubber data

| Compounding time | Standard | | | | Process according to the invention | | | |
|---|---|---|---|---|---|---|---|---|
| [min] | 4 | 3 | 2 | 1 | 4 | 3 | 2 | 1 |
| Test method: | | | | | | | | |
| Tensile strength [MPa] | 15.9 | 15.8 | 15.1 | 15.0 | 16.4 | 16.7 | 16.4 | 16.4 |
| Modulus, 300% [MPa] | 6.8 | 7.1 | 6.8 | 7.0 | 7.3 | 7.5 | 7.3 | 7.4 |
| Elongation at break [%] | 600 | 570 | 560 | 550 | 590 | 590 | 590 | 600 |
| Fracture energy [J] | 145 | 135 | 127 | 124 | 147 | 149 | 148 | 155 |
| Shore A hardness | 64 | 63 | 65 | 65 | 64 | 63 | 64 | 65 |
| Ball rebound: % | | | | | | | | |
| 0° C. | 18.7 | 18.1 | 17.9 | 18.1 | 18.4 | 18.3 | 18.2 | 18.4 |
| 60° C. | 35.1 | 34.8 | 34.3 | 33.9 | 37.5 | 36.8 | 37.1 | 36.3 |
| Loss angle: | | | | | | | | |
| tan δ (0° C.) | 0.374 | 0.373 | 0.368 | 0.368 | 0.381 | 0.374 | 0.359 | 0.365 |
| tan δ (60° C.) | 0.311 | 0.304 | 0.318 | 0.311 | 0.298 | 0.299 | 0.302 | 0.300 |

The comparison shows that even at the shortest compounding time (1'), the products according to the claimed process provide excellent properties. The advantages are particularly distinct with regard to strength values, fracture energy and greater elongation at break. There are also advantages with regard to rebound and tan δ at 60° C.

Example 2

Comparison of an Emulsion SBR Based Car Tread Compound Filled with Silica/TESPT (Standard Process in Comparison with Process According to the Invention)

a) Formulations

|  | 1 | 2 |
|---|---|---|
| PB II (standard) | 175 | — |
| EPB II (according to the invention) | — | 175 |
| ZnO RS | 3 | 3 |
| Stearic acid | 2 | 2 |
| Naftolen ZD | 10 | 10 |
| 6PPD | 2 | 2 |
| Wax | 1 | 1 |
| CBS | 1.5 | 1.5 |
| DPG | 2 | 2 |
| Sulfur | 1.5 | 1.5 | b) compounding process

1st stage
Internal mixer: GK 1.5 N, volume 1.6 L, friction 1:1.11, plunger pressure 5.5 bar

| Compound | 1 & 2 |
|---|---|
| PRM (sic) [1/min] | 60 |
| Temp. [° C.] | 50 |
| Filler loading | 0.8 |
| Compounding time: | |
| 0–3' | PB II or EPB II Naftolen ZD, ZnO RS, stearic acid, 6PPD, wax |
| 3' | cleaning and venting |
| 3'–4' | compounding and discharge |

-continued

Batch temperature: ~155° C.

2nd stage
Internal mixer: GK 1.5 N, volume 1.6 L, friction 1:1.11, plunger pressure 5.5 bar
RPM 40, temperature 50° C., filler loading 0.68

Compounding time:

| | |
|---|---|
| 0—0.5' | batch, stage 1 accelerator, sulfur |
| 0.5'–1.5' | compounding, discharge & sheeting out |

Batch temperature: ~110° C.

c) Technical rubber data

| Test method | Unit | 1 | 2 |
|---|---|---|---|
| Dispersion | Roughness factor | 3025 | 960 |
| Tensile strength | MPa | 20.2 | 22.7 |
| Modulus, 300% | MPa | 12.9 | 13.7 |
| Elongation at break | % | 410 | 440 |
| Fracture energy | J | 126 | 143 |
| Shore A hardness | — | 78 | 77 |
| DIN abrasion | mm$^3$ | 90 | 80 |

The products of the process according to the invention are distinguished by better dispersion, greater strength, greater reinforcing behaviour and better DIN abrasion.

What is claimed is:

1. A process for the production of finely divided, pulverulent rubber powder containing filler, comprising:
   a) mixing ≧50 wt. % of a filler with:
      (i) 0.1 to 6.5 parts by weight of water-soluble salts per 100 parts by weight of rubber, and
      (ii) a rubber latex or an aqueous emulsion of a rubber solution,
   b) reducing the pH value of the mixture formed in step a) to a value in the range from 5.5 to 4.5,
   c) adding the remainder of the filler as a filler suspension, and
   d) reducing the pH value to approximately 3.2 causing the precipitation of the rubber and the filler, wherein the filler suspension comprises water-soluble salts of a metal selected from group IIa, IIb, IIIa or VIII of the periodic table of elements.

2. The process according to claim 1, wherein the filler comprises a total content of ≧80 parts phr of filler, 1 to 10 parts phr of this quantity are added as the remainder.

3. The process according to claim 2, wherein the filler comprises a total content of ≧80 parts phr of filler, >10 to 20 parts phr of this quantity are added as the remainder.

4. The process according to claim 1, further comprising: adding carbon black having an average grain size of 1 to 9 μm.

5. The process according to claim 1, further comprising: adding silica in the form of a filter cake which has been washed until salt-free.

6. The process according to claim 1, further comprising: adding processing and/or vulcanization additives during the precipitation.

7. The process according to claim 1, wherein the water-soluble salts comprise aluminum sulfate.

8. The process according to claim 1, further comprising: performing the process in the presence of alkali metal silicate.

9. The process according to claim 8, further comprising: adding up to 5 phr of SiO$_2$ in the form of an alkali metal silicate solution.

10. The process according to claim 1, further comprising reducing the pH value to 2.5 before phase separation.

11. The process according to claim 1, further comprising: adding the pulverulent rubber powder to a mix for a vulcanizate.

* * * * *